Dec. 11, 1928.
R. NUTTALL
1,694,602
PROPULSION MEANS FOR AIRCRAFT OR THE LIKE
Filed April 13, 1926     2 Sheets-Sheet 1
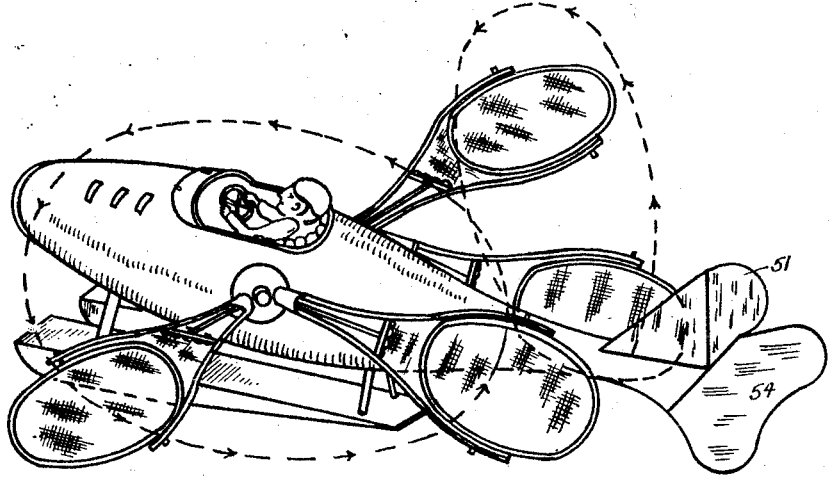
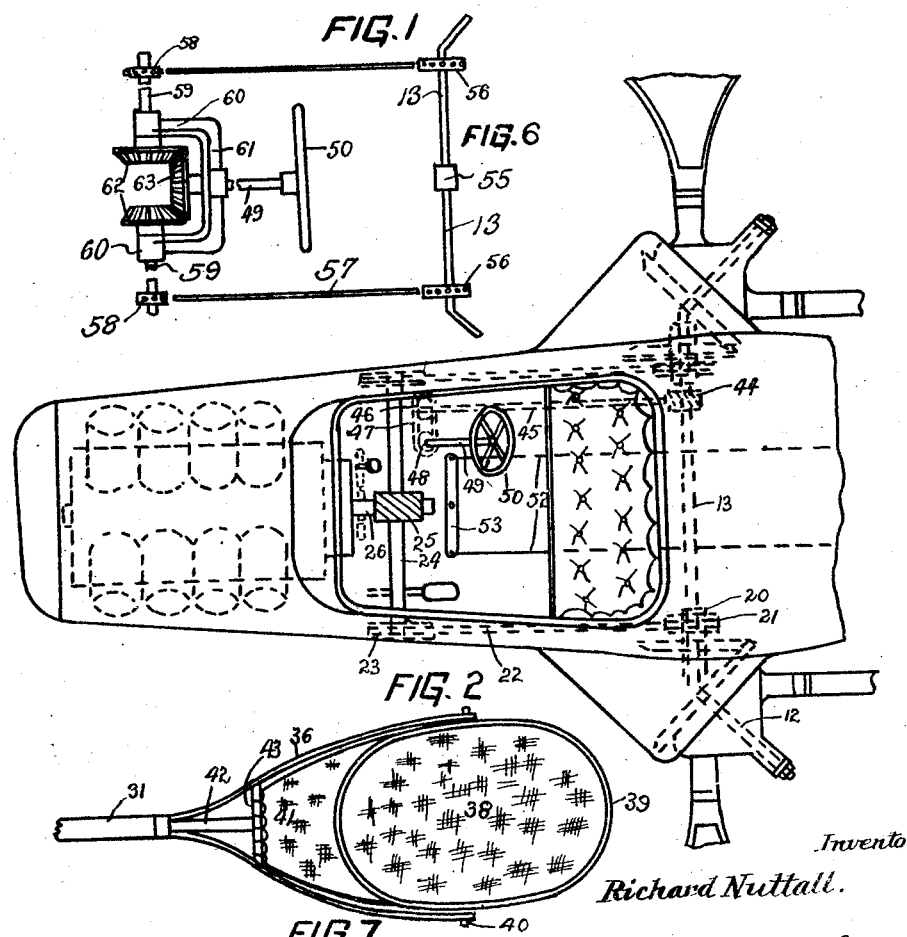
Inventor
Richard Nuttall.
By William C. Linton.
Attorney.

Dec. 11, 1928.
R. NUTTALL
1,694,602
PROPULSION MEANS FOR AIRCRAFT OR THE LIKE
Filed April 13, 1926  2 Sheets-Sheet 2
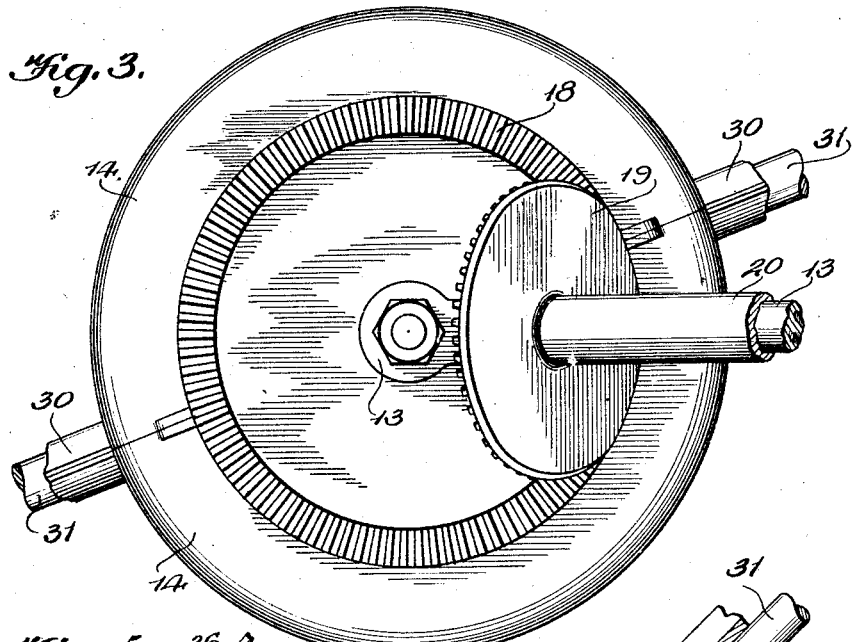
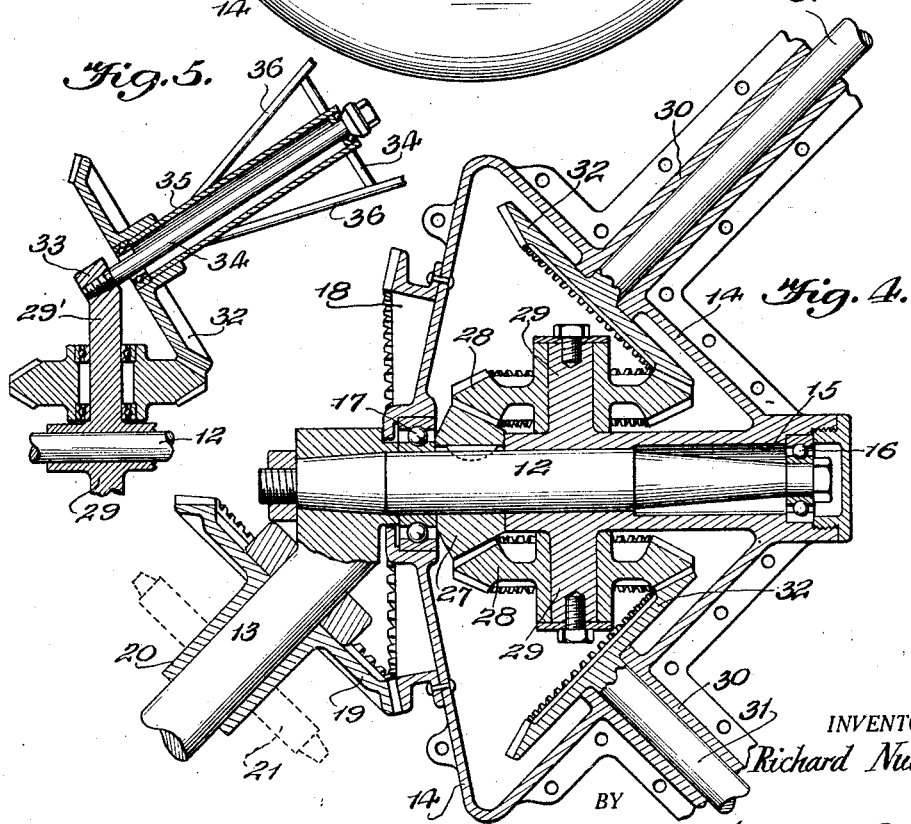
INVENTOR.
Richard Nuttall.
BY
William C. Linton
ATTORNEY.

Patented Dec. 11, 1928.

1,694,602

UNITED STATES PATENT OFFICE.

RICHARD NUTTALL, OF SYDNEY, NEW SOUTH WALES, AUSTRALIA.

PROPULSION MEANS FOR AIRCRAFT OR THE LIKE.

Application filed April 13, 1926, Serial No. 101,788, and in Australia March 11, 1925.

This invention relates particularly to the raising, sustaining and propelling of aircraft and has been especially devised in order to provide, an improved method whereby such purposes are achieved, and improved means and arrangement and operation thereof for the application of said method, and which means may be applied to other purposes such as the propulsion of water craft, and may be used as the wind driven part of wind mills and the like or as the force generating part of blowing, or draught creating, machines.

Hitherto air craft have been raised, sustained and propelled, and water craft have been propelled, principally by screw pitched propellers acting upon the air or water and wherewith a large percentage or degree of "slip" or loss of motive force has occurred and the wind operable parts of wind driven machines have been constructed of fans consisting of blades set at an angle to the path of rotation.

Now the main object of this invention is to depart from these constructions in order to avoid the slip and loss of motive force and to attain the desired results by creating partial vacuum rearwardly and direct pressure forwardly of planes or blades which are orbitally rotated in the air and laterally directed at one point of their cycle thus attaining the effect of a wing motion without the detrimental effect of "flapping", and by a maximum pushing effect in water during the advance position of the path and a minimum resistance during the retiring portion of such path, and a maximum obstruction and minimum resistance in wind driven machines, and these effects are achieved by using wings, planes or blades which during their orbital rotation are revolved upon their axis so as to alternate from flat on to edge on in order that in the advance or descent or active part of their orbital path they will be flat on and descend upon the air or push against water or present a maximum obstruction to wind, and in the retiring part of such path they will be "feathered" or turned edge on so that a minimum of resistance will occur.

A single wing may be used but it is proposed to arrange for aircraft, wings at each side of the machine for the purpose of balancing same and the operation of the engine, or the wings and/or additional wings may be positioned elsewhere in relation to the machine as may be found suitable or effective.

And in order that the invention and a practical application of the same according to a simple construction and arrangement will be readily understood the same will be described with reference to the accompanying drawings in which Figure 1 is a perspective of an aircraft with the invention applied thereto, Figure 2 is a plan of the same.

Figure 3 is a front elevation of one arrangement of means for actuating the wings or blade, Figure 4 is a diametrical sectional elevation of such means.

Figure 5 is a modified arrangement of the support for the shafts

Figure 6 is a plan of one construction of means for variably controlling and directionally manipulating the wings upon opposite sides of the craft.

Figure 7 is a plan of a suitable construction of a wing.

In each orbital cycle of a wing the path thereof is about parallel with the aircraft as it approaches its most rearward position when it is disposed with its edge in the direction of its motion and as it travels forwardly and until it reaches its highest position, then the wing travels gradually laterally and is disposed flat on against the air until it reaches its lowermost position at about right angles to the craft and then commences to retire edge on horizontally and gradually turn on its axis to edge on vertically as it reaches its most rearward position at which it is completely edge on and is then ready to commence another cycle.

The object with reference to aircraft is to drive the air downward under the machine and rearward according to the precessing of the angle of the axles about which the wings are orbitally rotated the angle at which such axles are set to resulting in the machine being caused to rise, poise or move forward.

At each side of the machine and adapted to be set at any angle thereto between say 40 and 50 degrees is a stub axle 12 secured to and projecting from each end of a rockable shaft 13 secured across the machine.

On the axle 12 is a hollow hub bracket 14 which is in halves bolted together and has a central bore 15 with bearings 16 and 17 at opposite ends and carries an external bevel gear 18 which meshes with a bevel gear 19 mounted on a sleeve or hollow shaft 20 revolvable on the shaft 13 and carrying a sprocket 21 for transmission of motion thereto by a chain 22 from a sprocket 23 on a shaft 24 which is driven by suitable gear 25 on the engine shaft 26.

Preferably the shaft 24 is divided and each end carries a gear meshable with differential gear on the engine shaft or a shaft driven therefrom so that one shaft 24 may be driven at a faster or slower speed in relation to the other for the purpose of accelerating or slowing the rotation and revolution of the wing shafts as may be necessary or convenient.

Affixed on the axle 12 within the hub bracket 14 is a bevel gear 27 which meshes with bevel gears 28 revolvably mounted upon axles 29 projecting at right angles from the wall of the bore 15 of the hub 14. Projecting at requisite angle from the hub bracket 14 are journals 30 and in each is revolvably mounted the wing shaft 31 on the inner end of which within the hub bracket 14 is a bevel gear 32 which is in mesh with the bevel gear 28.

In the modified arrangement (Figure 5) each axle 29 is extended as shown at 29' and has an angular end 33 in which is secured an axle 34 and thereon is revolvably mounted a hollow wing shaft 35 which has the bevel gear 32 secured thereon and to which shaft the wing is secured by suitable supports such as arms 36 and strut 37. It will be noted that in this modified arrangement, instead of the wings being mounted on the solid wing shaft 31 in journals 30 (Fig. 4), the wings are mounted on the hollow wing shafts 35 which are carried by the axles 34 in the extended ends 33 of the axles 29.

On the free projecting end of each wing shaft 31 is secured the wing or blade 38 which may be of any suitable construction and of any convenient and efficient material and may be either flat and a fixture, or may be as in Figure 7, the shaft 31 carrying diverged arms 36 in which is secured a flat wing area 38 of suitable material, but preferably a hoop 39 with suitable material stretched thereacross, is pivoted by trunnions 40 between the members 36 and flexible and preferably somewhat elastic material 41 is connected from a strut 37 or a cross head 43 between the arms 36 to the adjacent edge of the wing area 38 or of the hoop 39 so that as the opposite sides of the wing are forward such area 38 may turn slightly upon its hinges as allowed by the flexible material 41 and allow a concavity or pocket to be formed in the forwardly travelling face of the wing.

For the purpose of altering the angle of the stub axles 12 carried by the shaft 13 said shaft 13 is operably geared by worms 44, shaft 45, sprocket 46 and chain 47 to a sprocket 48 upon a steering post 49 carrying wheel 50.

In this arrangement it is necessary to provide the craft with a horizontally oscillatable rudder 51 which is controlled by any convenient means such as connections 52 from a foot operated lever 53.

For regulating the ascent and descent of the craft a vertically oscillatable vane 54 is provided and is controlled by suitable means not shown.

It is preferable to have each stub axle 12 independently oscillatable so that the angle of one may be altered relatively to the other and for this purpose the shaft 13 fixed across the craft is divided with the ends in revolvable engagement as at 55 (Figure 6) and each end is operably geared by a sprocket 56 thereon and a chain 57 therearound to a sprocket 58 upon one of a pair of independently revolvable control shafts 59 each having bearing in one arm 60 of a bracket and carrying on its inner end a bevel gear 62 which is in mesh with a bevel gear 63 upon the inner end of a steering post 49 revolvably mounted in the bridge 61 of said bracket and carrying on its other end a steering wheel 50. The arms 60 serving as a bearing for shaft 59, are adapted to move freely about said shafts, and by oscillating the post 49 so as to rotate the control shafts 59 the angle of the stub axles 12 each carried in the projecting angled end of the shaft 13 and the inclination of action of the wings are varied in unison as desired, and by partially revolving said post 49 with the wheel 50 the angles of the stub axles 12 and consequently the inclination of action of the wings upon one side of the craft are varied in relation to those upon the other side and so the steering and manipulation of the craft is effected without a rudder.

The means described of conveying motion from the engine to the wings and for controlling and manipulating the angle of the stub axles are practical and efficient but I do not confine the application of my invention to such means and it is to be understood that any other practical means may be used.

I claim:—

1. Improved means for the purposes stated, consisting of, an angularly adjustable axle, means for controlling said axle, a hub bracket upon said axle and adapted to be revolved thereon, radially disposed revolvable shafts carried by said hub bracket and adapted to carry a wing or blade, means for revolving said hub bracket, and means for revolving said shafts.

2. Improved means for the purposes stated, consisting of, an angularly adjustable axle, means for controlling said axle, a hub bracket upon said axle, radially disposed revolvable shafts carried by said hub bracket, a gear upon each said shaft in mesh with an idle gear carried upon said hub bracket and in mesh with a fixed gear on said axle, and means on said hub bracket in engagement with transmission mechanism from a source of rotation.

3. Propulsion means of the character described comprising a wing, a rotatable hub bracket carrying the wing, and means in the hub bracket engageable with the wing whereby said wing will be caused to revolve upon its axis, with rotation of said hub bracket.

4. Propulsion means of the character described comprising a wing, a rotatable hub bracket carrying the wing, a shaft within the hub bracket operatively connected thereto, and means mounted on said shaft engageable with the wing, whereby said wing will be caused to revolve upon its axis with rotation of said hub bracket.

5. Propulsion means of the character described comprising a plurality of wings, a hub bracket carrying said wings, a hollow shaft mounted in said hub bracket and having means engaging said wings to revolve the same, an axle within the hollow shaft and means mounted on said axle and engageable with the hub bracket to rotate the same.

6. Propulsion for air and water crafts comprising hub brackets positioned on each side of the craft, and having wings adapted to rotate therewith, means within the hub brackets engageable with the wings to revolve the same, a shaft for each hub bracket, and means operatively connected to said shafts whereby the same will be caused to rotate in a same or opposite direction to each other.

7. Propulsion means for air and water crafts comprising hub brackets positioned on each side of the craft, and having wings adapted to rotate therewith, a hollow shaft mounted in said hub brackets and having means engaging said wings to revolve the same, an axle within each hollow shaft, a rockable shaft carried by each axle and having means engageable with the hub brackets to actuate the same, and means operatively connected to rockable shafts whereby said rockable shafts will be caused to rotate in a same or opposite direction to each other.

8. Propulsion means of the character described comprising a plurality of wings, a hub bracket carrying said wings, means to rotate said hub bracket, and means in engagement with said first means to revolve the wings upon rotation of the hub bracket.

Dated this 6th day of March, one thousand nine hundred and twenty-six.

RICHARD NUTTALL.